July 21, 1964 — R. P. ROHDE — 3,141,689

MOUNTING MEANS

Original Filed April 12, 1961

INVENTOR.
Robert P. Rohde
BY
E. W. Christen
ATTORNEY

United States Patent Office 3,141,689
Patented July 21, 1964

1

3,141,689
MOUNTING MEANS
Robert P. Rohde, Saginaw, Mich., assignor to General Motors Corporation, Detroit, Mich., a corporation of Delaware
Continuation of application Ser. No. 102,611, Apr. 12, 1961. This application Dec. 17, 1962, Ser. No. 246,302
4 Claims. (Cl. 287—53)

This is a continuation of the earlier filed application Serial No. 102,611, now abandoned, entitled "Mounting Means," filed on April 12, 1961.

This invention relates to mounting means, and more particularly to a means for securing a pulley hub or the like to a shaft.

In many installations and articles of manufacture, where a belt or chain is used to drive rotating members, it is necessary to secure the pulley or sprocket to the shaft such that there will be positive rotation of the pulley or sprocket along with the shaft and little or no possibility of the pulley or sprocket disengaging from the shaft.

To accomplish this purpose it has been the practice to utilize either a tapered shaft, or a pulley or sprocket having a tapered bore, and pounding the pulley or sprocket onto the shaft for proper securement. This often results in damaged parts, either the pulley or shaft, which required expensive and extensive repairs or replacements. Furthermore, the pulley or sprocket had to be pounded off the shaft for replacement or repair of any of the various parts, again possibly resulting in breakage.

The device in which this invention is embodied comprises, generally, a mounting hub which is spline or key connected to the shaft and which is not tapered. The hub is provided with a cylindrical opening surrounding the shaft and receiving a sleeve nut for proper positioning of the pulley hub on the shaft. There are no tapered members and it is not necessary to pound or otherwise force the hub on or off the shaft in such a manner as to break or deform the various parts. The sleeve nut utilizes the mechanical advantage of a threaded portion on the end of the shaft to seat the hub and clamp the hub in its proper position. This permits simple installation and service, eliminating the necessity of pounding the parts together, and makes a much more economical installation and assembly.

These and other advantages will become more apparent from the following description and drawing, in which.

Figure 1:
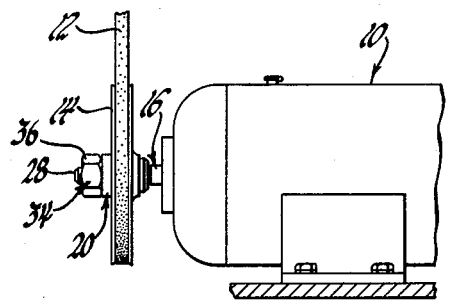
FIGURE 1 is a view of a typical pulley installation.

Referring more particularly to the drawing, FIGURE 1 best illustrates a typical installation of a device in which a pulley is utilized. A machine or the like, illustrated generally by the numeral 10, is to be rotated by, or is to cause to rotate, another device by means of a belt 12 which encircles a pulley 14. Pulley 14 is mounted on a shaft 16 which is driven by, or which drives the machine 10. It is to be understood that instead of pulley 14 and belt 12 a sprocket and chain could be used, or any other driving or driven means wherein a circular member is secured to a rotating shaft.

Figure 2:
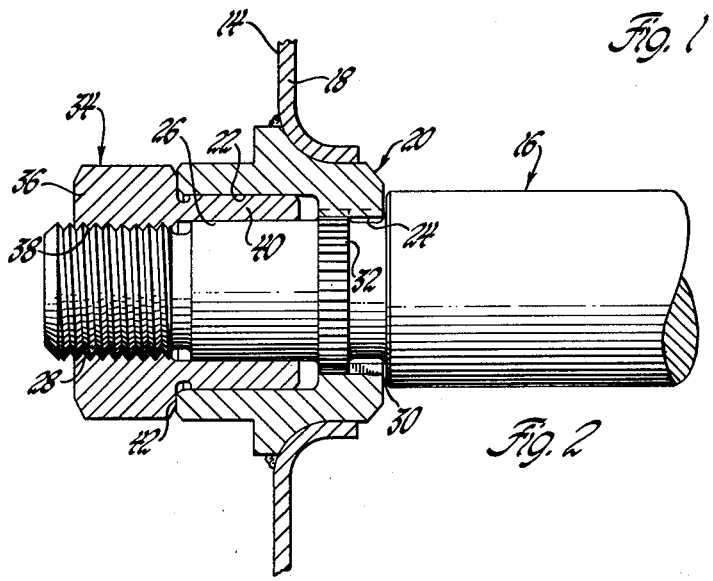
FIGURE 2 is an enlarged sectional view of a portion of the typical installation illustrated in FIGURE 1, showing the various parts of the mounting assembly.
Figure 3:
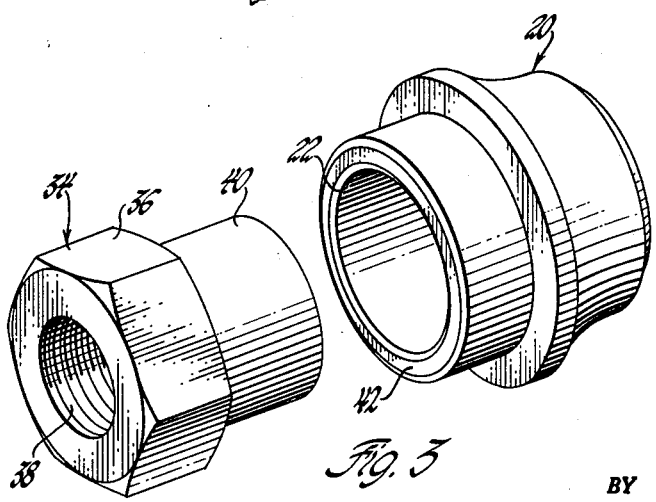
FIGURE 3 is an isometric view of the hub and sleeve nut illustrated in FIGURE 2.

FIGURE 2 more clearly illustrates the mounting of the shaft 16. For illustration purposes, pulley 14 is shown to include a sheet metal portion 18 secured in any suitable manner to a hub, illustrated generally by the numeral 20. This securement may be in the form of screws or bolts, or the sheet metal portion 18 may be welded to the hub 20.

2

Hub 20 is provided with a stepped internal bore having a large diametered portion 22 and a smaller diametered portion 24. The purpose of the difference in diameters will hereinafter become more apparent.

Shaft 16, at its exposed end, is provided with a portion of reduced diameter 26, which portion terminates in a threaded section 28. Between the threaded section 28 and the main portion of the shaft 16 is a generally uninterrupted portion which adjoins the shaft 16 forming a shoulder 30. In the uninterrupted portion an external spline 32, or some other means such as a Woodruff key, may be provided to engage the portion of smaller diameter 24 of the hub 20. This is to provide positive rotation of the hub 20 along with the shaft 16 and to prevent relative rotation therebetween.

In order to secure the hub 20 on the shaft 16 a sleeve nut, illustrated generally by the numeral 34, is provided. Nut 34 has an end portion 36 which has a conventional polygonal cross-section to receive a wrench or other driving means. Portion 36 is provided with an internal thread 38 which is received on thread 28 at the end of the shaft 16. The sleeve portion 40 of the nut 34 has an uninterrupted inner bore which is of substantially the same diameter as the reduced portion 26 of the shaft 16. The outer surface of the sleeve 40 is cylindrical in shape and has an outer diameter substantially the same as the diameter of the larger portion 22 of the bore in the hub 20. The sleeve 40 is adapted to fit closely between the hub and the shaft 26 to properly seat the hub on the shaft.

Upon assembly of the pulley to the shaft 16, the hub 20 may be easily inserted over the reduced end 26 of the shaft 16 to engage the splines 24 and 32, or other rotation preventing means. The sleeve nut 34 is then placed in position over the reduced end 26 of the shaft 16 with the sleeve 24 disposed between the hub 20 and the reduced portion 26 of the shaft 16. In this position the extreme end of the threaded portion 28 of the shaft 16 will engage the internal thread 38 of the nut 34, and as the nut 34 is rotated in the proper direction it will advance along the threads 28 to move the sleeve between hub 20 and the shaft portion 26 and form a tight and solid connection. When the sleeve nut 34 is driven home, the forward end of the pulley hub 20 will engage the shaft at shoulder 30 and the rearward end of the hub 20 will engage the nut portion 36 of the sleeve nut 34, as at 42. In this position, the pulley hub 20 is properly positioned and supported on the solid, uninterrupted portion of the shaft 16. Thus, the hub will be clamped between the sleeve nut 34 and the shaft 16 to prevent axial movement. Radial movement, of course, is prevented by the sleeve 40 closely disposed between the hub 20 and the portion 26 of the shaft 16.

It is easily seen that when removal of the pulley from the shaft is desired it is necessary only to back off the sleeve nut 34 from the threads 28 to disassemble the installation. The mechanical advantage of the thread 28 is offered in this direction as well, permitting the sleeve nut 34 to be drawn from its tight engagement with the shaft 16 and the hub 20.

Thus, a hub mounting installation is provided which is relatively simple to assemble and does not require the use of tapered members in order to secure against relative rotation. The mounting makes use of the mechanical advantage offered by threaded members and the result is a secure, nonrotating, properly supported connection which may be disassembled and re-used without damage.

What is claimed is:

1. Means for mounting a pulley comprising a shaft having a threaded end and an annular integral shoulder spaced from said end, a hub having an axial stepped bore formed therethrough received on said shaft, the diameter of the smaller portion of said bore being substantially the same as the diameter of said shaft and the diameter of the larger portion of said bore being greater than the diameter of said shaft, a nut member threadedly received on the end of said shaft and having a tubular sleeve extending therefrom and between said shaft and said hub member and inwardly of said threaded end of said shaft, said nut member having a shoulder formed thereon engaging said hub and clamping said hub between said last named shoulder and said shoulder on said shaft, and means disposed between said shaft and said hub to prevent relative rotation therebetween.

2. A mounting installation comprising a shaft having a threaded end and a shoulder integrally formed thereon axially spaced from said threaded end, a hub member having an axial stepped bore formed therethrough received on said shaft and abutting said shoulder, the diameter of the smaller portion of said bore being substantially the same as the diameter of said shaft and the diameter of the larger portion being greater than the diameter of said shaft, a nut member received on said threaded end of said shaft and having an axially extending sleeve, the inner diameter of said sleeve being substantially the same as the diameter of said shaft and the outer diameter of said sleeve being substantially the same as the diameter of the larger portion of said bore in said hub member, said sleeve being received between said hub member and said shaft and inwardly of said threaded end for supporting said hub member on said shaft and being forcibly received between said hub member and said shaft by the rotation of said nut member on said threaded end of said shaft, said nut member having a shoulder formed thereon for engaging said hub and clamping said hub between said last named shoulder and said shoulder on said shaft, and means disposed between said shaft and said hub member to prevent relative rotation therebetween.

3. A pulley mounting installation comprising a shaft having a large portion and a portion of reduced diameter at one end, a thread formed on the end of said reduced portion, a hub having a stepped bore formed therethrough received on said reduced portion of said shaft, the internal diameter of one part of said hub being substantially the same as the diameter of said reduced portion of said shaft, the remainder of said hub having an internal diameter larger than the diameter of said reduced portion of said shaft, a nut member having an upstanding head portion, a threaded portion received on the threaded end of said reduced portion of said shaft, and a sleeve extending from said threaded portion of said head portion, said sleeve having an internal diameter substantially the same as the diameter of said reduced portion of said shaft and an external diameter substantially the same as the internal diameter of said remainder of said hub, said head portion having a greater diameter than said sleeve, said sleeve being forcibly disposed between said hub and said reduced portion of said shaft by the rotation of said nut member on said threaded end of said shaft, said hub being clamped between said upstanding head portion of said nut member and said large portion of said shaft, and means disposed between said shaft and said hub to prevent relative rotation therebetween.

4. A pulley mounting installation comprising a shaft having a large portion and a portion of reduced diameter at one end thereof, said large and reduced portions of said shaft forming an integral abutment shoulder therebetween, a hub having a stepped bore formed therethrough received on said reduced portion of said shaft, the smaller internal diameter of said hub being substantially the same as the diameter of said reduced portion of said shaft, the larger internal diameter of said hub being larger than the diameter of said reduced portion of said shaft, said hub being movable axially of said shaft to a position wherein the end of said hub adjacent the smaller diameter portion of said bore contacts said shaft abutment shoulder, threads on said reduced portion of said shaft, a nut having an enlarged head portion and a reduced diameter sleeve portion having an internal diameter substantially the same as the diameter of said reduced portion of said shaft and an external diameter substantially the same as the larger internal diameter of said hub, said nut having internal threads for coacting with said threads on said reduced portion of said shaft, said sleeve being positioned between said larger internal diameter of said bore and said reduced portion of said shaft for supporting a portion of said hub, said enlarged head portion of said nut forming a shoulder adjacent said sleeve portion for contacting the end of said hub adjacent the larger diameter portion of said bore, said nut shoulder contacting the last named end of said hub to force said hub into contact with said shaft shoulder upon tightening of said nut on said threads.

References Cited in the file of this patent
UNITED STATES PATENTS 2,552,102    Lyons _____ May 8, 1951
2,789,401    Hargreaves _____ Apr. 23, 1957

FOREIGN PATENTS 115,204    Sweden _____ Oct. 16, 1945